(12) United States Patent
Okabe et al.

(10) Patent No.: US 8,246,402 B2
(45) Date of Patent: *Aug. 21, 2012

(54) OUTBOARD MOTOR

(75) Inventors: Yoshihiko Okabe, Shizuoka (JP); Daisuke Nakamura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 615 days.

This patent is subject to a terminal disclaimer.

(21) Appl. No.: 12/365,277

(22) Filed: Feb. 4, 2009

(65) Prior Publication Data

US 2009/0203489 A1    Aug. 13, 2009

(30) Foreign Application Priority Data

Feb. 8, 2008    (JP) .................................. 2008-028854

(51) Int. Cl.
*B63H 20/14*    (2006.01)
*F16H 3/44*    (2006.01)
(52) U.S. Cl. .......................................... 440/75; 475/312
(58) Field of Classification Search .................. None
See application file for complete search history.

(56) References Cited

U.S. PATENT DOCUMENTS

| 2,578,308 | A | * | 12/1951 | Iavelli | 475/142 |
| 3,359,833 | A | * | 12/1967 | Flinn | 475/127 |
| 5,055,098 | A | * | 10/1991 | Umebayashi et al. | 475/312 |
| 6,439,937 | B1 | * | 8/2002 | Mansson et al. | 440/75 |
| 6,582,259 | B1 | * | 6/2003 | Mansson et al. | 440/75 |
| 7,670,244 | B2 | * | 3/2010 | Shioiri et al. | 475/210 |
| 7,704,183 | B2 | * | 4/2010 | Nakamura et al. | 475/312 |
| 7,798,874 | B2 | * | 9/2010 | Fukuoka | 440/75 |
| 2008/0227585 | A1 | * | 9/2008 | Okabe | 475/269 |
| 2009/0203491 | A1 | * | 8/2009 | Okabe et al. | 475/331 |

FOREIGN PATENT DOCUMENTS

JP    2785200 B2    8/1998

OTHER PUBLICATIONS

Okabe et al.; "Outboard Motor"; U.S. Appl. No. 12/365,283, filed Feb. 4, 2009.

* cited by examiner

*Primary Examiner* — Dirk Wright
(74) *Attorney, Agent, or Firm* — Keating & Bennett, LLP

(57) ABSTRACT

An outboard motor includes an engine that generates power and a transmission device arranged to change the speed of rotation of the engine and to transmit the rotation to a propeller. The transmission device includes a planetary gear type transmission mechanism arranged to shift to any of a plurality of speed positions, and the planetary gear type transmission mechanism is controlled to shift such that a sun gear and planetary gears unitarily rotate when a speed position is a normally used speed position. The outboard motor achieves a reduction in load normally caused by engagements between gears in a normally used speed position and also achieves significant improvement in durability of the gears.

5 Claims, 7 Drawing Sheets

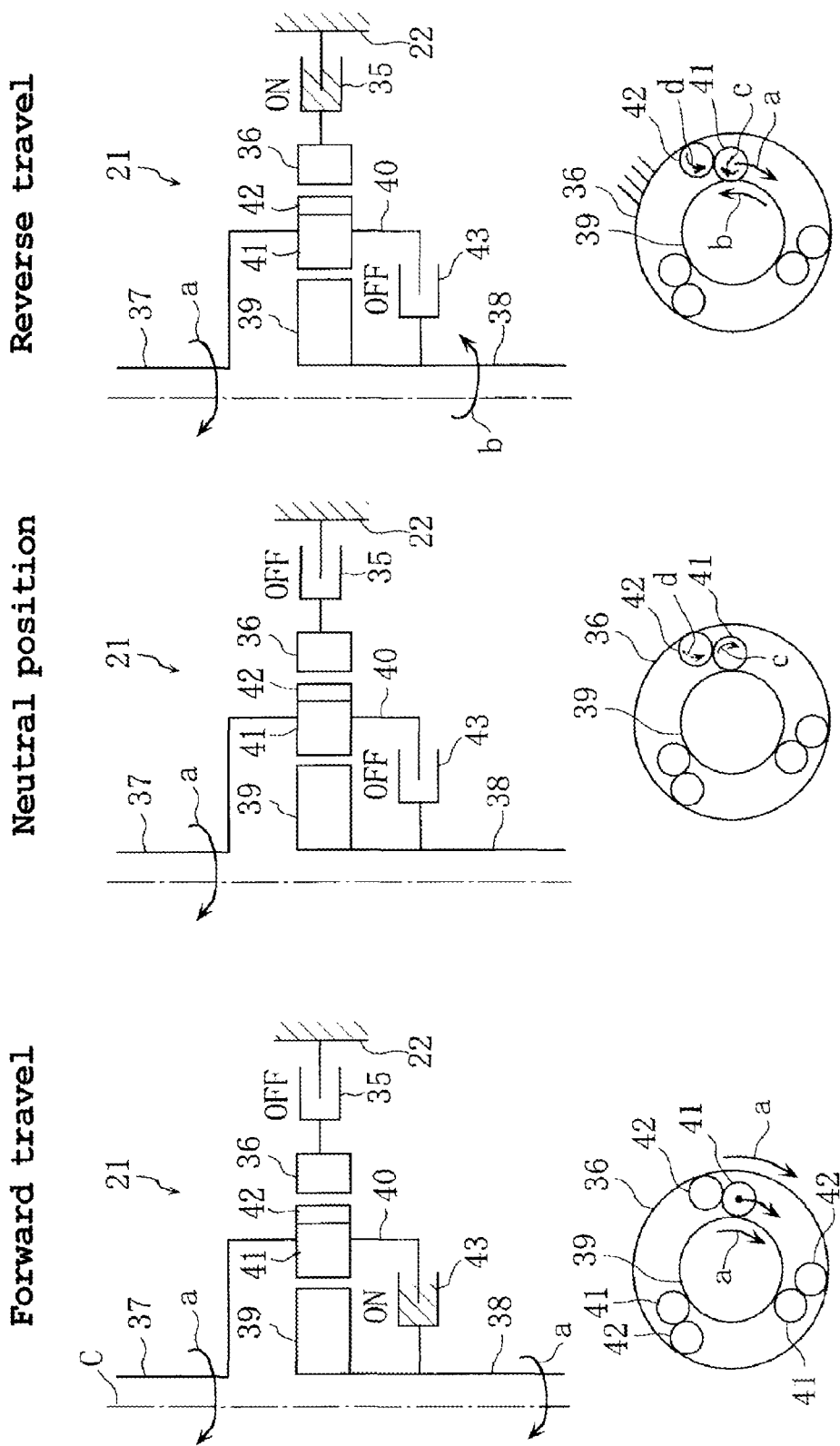

OUTBOARD MOTOR

BACKGROUND OF THE INVENTION

1. Field of the Invention

The present invention relates to an outboard motor including a transmission device arranged to change a speed of rotation of an engine and to transmit the rotation to a propeller.

2. Description of the Related Art

Because an outboard motor that is installed in a small watercraft is subject to large water resistance, there are times when a planetary gear type transmission device that can make a smooth speed change operation during acceleration or deceleration is applied. For example, JP-B-2785200 suggests a planetary gear type transmission device capable of making shifts to a low speed position during low speed traveling or trolling and to a high speed position during normal traveling.

In the planetary gear type transmission device, a sun gear is fixed so as to be unable to rotate when a shift lever is shifted to the high speed position. A planetary gear revolves on the sun gear in response to rotation of an internal gear when rotation of an engine is transmitted from an input shaft to the internal gear. The revolution of the planetary gear is transmitted from a drive shaft to a propeller via a carrier.

However, in many cases the outboard motor is normally operated in forward and high speed positions. Therefore, the outboard motor requires enhanced durability of each gear of the transmission device for the forward and high speed positions that are normally used. However, in the conventional outboard motor, the planetary gear revolves on the sun gear in the normally used high speed position. Therefore, the outboard motor is normally in a state that a load due to engagement between both the gears is large. This results in a problem that it is difficult to obtain sufficient durability in both of the gears.

SUMMARY OF THE INVENTION

In order to overcome the problems described above, preferred embodiments of the present invention provide an outboard motor that reduces the load due to engagement between gears in a normally used speed position and achieves significant improvement in durability of the gears.

A first preferred embodiment of the present invention provides an outboard motor including an engine arranged to generate power, and a transmission device arranged to change the speed of rotation of the engine and to transmit rotation to a propeller, in which the transmission device includes a planetary gear type transmission mechanism arranged to make a shift to any speed position among a plurality of speed positions, and the planetary gear type transmission mechanism is controlled to shift such that a sun gear and a planetary gear unitarily rotate when a speed position is a normally used speed position.

A second preferred embodiment of the present invention provides the outboard motor in accordance with the first preferred embodiment, in which the planetary gear type transmission mechanism is a two-speed transmission mechanism having a first internal gear connected to a first input shaft on an engine side, a first sun gear connected to a housing via a first clutch or brake (hereinafter referred to as a clutch), a first carrier connected to a first output shaft on a propeller side, a first planetary gear rotatably supported by the first carrier and meshed with the first sun gear and the first internal gear, and a second clutch or brake (hereinafter referred to as a clutch) located between the first sun gear and the first carrier, and in which the first clutch is disengaged and the second clutch is engaged in a high speed position.

A third preferred embodiment of the present invention provides an outboard motor including an engine arranged to generate power, and a transmission device arranged to change the speed of rotation of the engine and to transmit the rotation to a propeller, in which the transmission device includes a planetary gear type forward-reverse switching mechanism, and the planetary gear type forward-reverse switching mechanism is controlled to shift such that a sun gear and a planetary gear unitarily rotate during forward traveling.

A fourth preferred embodiment of the present invention provides the outboard motor in accordance with the third preferred embodiment, in which the planetary gear type forward-reverse switching mechanism includes a second internal gear connected to a housing via a third clutch or brake (hereinafter referred to as a clutch), a second sun gear connected to a second output shaft on a propeller side, a second carrier connected to a second input shaft on an engine side, a second planetary gear rotatably supported by the second carrier and meshed with the second sun gear and the second internal gear, and a fourth clutch or brake (hereinafter referred to as a clutch) located between the second carrier and the second output shaft, and in which the third clutch is disengaged and the fourth clutch is engaged during forward traveling.

A fifth preferred embodiment of the present invention provides an outboard motor including an engine arranged to generate power, and a transmission device arranged to change the speed of rotation of the engine and transmit rotation to a propeller, in which the transmission device includes a planetary gear type transmission mechanism making a shift to any speed position among a plurality of speed positions and a planetary gear type forward-reverse switching mechanism, the planetary gear type transmission mechanism is controlled to shift such that a sun gear and a planetary gear unitarily rotate when a speed position is a normally used speed position, and the planetary gear type forward-reverse switching mechanism is controlled to shift such that a sun gear and a planetary gear unitarily rotate during forward traveling.

A sixth preferred embodiment of the present invention provides the outboard motor in accordance with the fifth preferred embodiment, in which the planetary gear type transmission mechanism is a two-speed transmission mechanism which has a first internal gear connected to a first input shaft on an engine side, a first sun gear connected to a housing via a first clutch, a first carrier connected to a first output shaft on a propeller side, a first planetary gear rotatably supported by the first carrier and meshed with the first sun gear and the first internal gear, and a second clutch located between the first sun gear and the first carrier, and arranged to shift to either a high speed position or a low speed position, and the planetary gear type forward-reverse switching mechanism includes a second internal gear connected to the housing via a third clutch, a second sun gear connected to a second output shaft on the propeller side, a second carrier connected to a second input shaft on the engine side, a second planetary gear rotatably supported by the second carrier and meshed with the second sun gear and the second internal gear, and a fourth clutch located between the second carrier and the second output shaft, and in which the first clutch is disengaged, the second clutch is engaged, the third clutch is disengaged, and the fourth clutch is engaged in forward traveling in a high speed position.

In the outboard motor in accordance with the first preferred embodiment of the present invention, when the planetary gear type transmission mechanism is shifted to the normally used speed position, the sun gear and the planetary gear unitarily rotate together and thus do not rotate relative to each other. This allows for a significant reduction in engagement load caused by relative rotation between the sun gear and the planetary gear and greatly improves the durability of each of the gears.

In accordance with the second preferred embodiment of the present invention, the planetary gear type transmission mechanism is constructed such that the first sun gear is connected to the housing via the first clutch and the second clutch is located between the first sun gear and the first carrier connected to the first output shaft. Further, the first clutch is disengaged and the second clutch is engaged in the high speed position. This allows the first internal gear, the first sun gear, and the first planetary gear to unitarily rotate. As a result, this unique construction significantly reduces the load due to engagements between the internal gear, the sun gear, and the planetary gear and improves durability of the gears.

In the outboard motor in accordance with the third preferred embodiment of the present invention, when the planetary gear type forward-reverse switching mechanism is shifted to the forward position, the sun gear and the planetary gear unitarily rotate. This allows for a reduction in load caused by engagement between the sun gear and the planetary gear in normal forward operation and achieves a significant improvement in durability of each of the gears.

In accordance with the fourth preferred embodiment of the present invention, the planetary gear type forward-reverse switching mechanism is constructed such that the second internal gear is connected to the housing via the third clutch and the fourth clutch is located between the second carrier connected to the second input shaft on the engine side and the second output shaft on the propeller side connected to the second sun gear. Furthermore, the third clutch is disengaged and the fourth clutch is engaged during forward traveling. This allows the second internal gear, the second sun gear, and the second planetary gear to unitarily rotate. As a result, this unique construction significantly reduces the load caused by engagements between each gear and achieves a significant increase in durability.

The outboard motor in accordance with the fifth preferred embodiment of the present invention is constructed such that the sun gear and the planetary gear unitarily rotate when the planetary gear type transmission mechanism is shifted to the normally used speed position and such that the sun gear and the planetary gear unitarily rotate when the planetary gear type forward-reverse switching mechanism is shifted to the forward position. This allows for a reduction in the engagement load caused by relative rotations between the sun gears and the respective planetary gears in the forward and high speed positions that are most frequently used, thus allowing for an improvement in durability of each of the gears of the transmission mechanism and the forward-reverse switching mechanism.

In accordance with the sixth preferred embodiment of the present invention, the planetary gear type transmission mechanism is constructed such that the first sun gear is connected to the housing via the first clutch and the second clutch is located between the first sun gear and the first carrier connected to the first output shaft. In addition, the planetary gear type forward-reverse switching mechanism is constructed such that the second internal gear is connected to the housing via the third clutch and the fourth clutch is located between the second carrier connected to the second input shaft on the engine side and the second output shaft on the propeller side connected to the second sun gear. The first clutch is disengaged, the second clutch is engaged, the third clutch is disengaged, and the fourth clutch is engaged during forward traveling in the high speed position. This allows for unitary rotations among the first internal gear, the first sun gear, and the first planetary gear, and among the second internal gear, the second sun gear, and the second planetary gear during the forward traveling in the high speed position, thereby achieving enhancement of the durability of each of the gears of the transmission mechanism and the forward-reverse switching mechanism.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 6A-6C are schematic block diagrams showing actions of a planetary gear type forward-reverse switching mechanism in accordance with a preferred embodiment of the present invention.

DETAILED DESCRIPTION OF THE PREFERRED EMBODIMENTS

Figure 1:
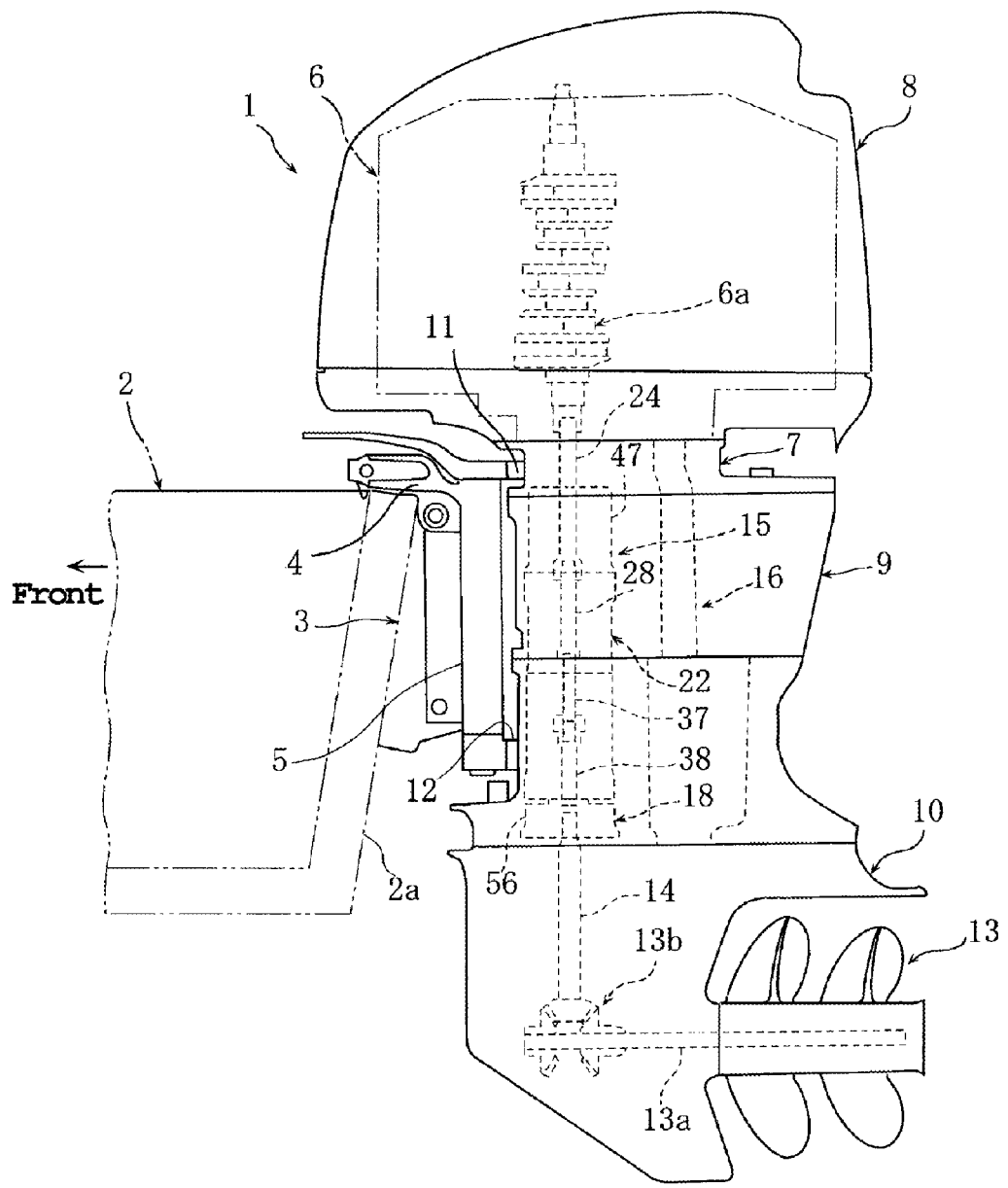
FIG. 1 is a side view of an outboard motor including a transmission device in accordance with a preferred embodiment of the present invention.

Preferred embodiments of the present invention will be described hereinafter with reference to the attached drawings.

FIGS. 1 through 7 are drawings for describing an outboard motor including a transmission device in accordance with preferred embodiments of the present invention. Front, rear, right, and left in descriptions of the preferred embodiments denote front, rear, right, and left in the view as seen from the rear of a hull unless otherwise specified.

In the figures, a reference numeral 1 denotes an outboard motor installed in a stern 2a of a hull 2. The outboard motor 1 is supported swingably in the vertical direction by a clamp bracket 3 fixed to the hull 2 via a swivel arm 4 and supported to be steerable to right and left via a pivot member 5.

The outboard motor 1 has an engine 6 generating power, an exhaust guide 7, a cowling 8, an upper case 9, and a lower case 10.

The engine 6 is an engine with a vertically oriented crankshaft in which a crankshaft 6a is disposed in a generally vertical direction. The engine 6 is mounted on the exhaust guide 7. The cowling 8 is arranged to cover an outer periphery of the engine 6 and is connected to an upper surface of the exhaust guide 7. The upper case 9 is connected to a lower surface of the exhaust guide 7. The lower case 10 is connected to a lower surface of the upper case 9.

The outboard motor 1 is supported by the clamp bracket 3 via an upper mount member 11 mounted on the exhaust guide 7 and a lower mount member 12 mounted on a lower end of the upper case 9.

The outboard motor 1 includes a transmission device 15 arranged to change a speed of rotation of the engine 6 and transmit the rotation to a propeller 13.

The propeller 13 is attached to a propeller shaft 13a. The propeller shaft 13a is connected to a drive shaft 14 via a bevel gear mechanism 13b. The propeller shaft 13a is disposed in a direction perpendicular to the crankshaft 6a in the lower case 10. The drive shaft 14 is coaxially disposed with the crankshaft 6a.

The transmission device 15 includes a planetary gear type transmission mechanism 20 (shown in FIG. 2) making a shift to any speed position among a plurality of speed positions, a planetary gear type forward-reverse switching mechanism 21 connected to the transmission device 20, and a planetary gear type speed reducing mechanism 18 connected to the forward-reverse switching mechanism 21. Herein, a reference symbol C (shown in FIG. 3) denotes the center line of the transmission device 15 and is coaxial with the crankshaft 6a.

The transmission device 15 is housed in a generally cylindrical housing 22 that is oil-tight. The housing 22 is housed in the upper case 9 to be positioned in the foremost end thereof. An exhaust system 16 arranged to discharge exhaust gas from the lower case 10 into the water is disposed in the rear of the transmission device 15 in the upper case 9.

The housing 22 is divided into an upper housing 22a in which the transmission mechanism 20 is housed and a lower housing 22b in which the forward-reverse switching mechanism 21 is housed.

The planetary gear type speed reducing mechanism 18 is housed in a speed reducer housing 56 arranged independently of the housing 22. The planetary gear type speed reducing mechanism 18 includes an internal gear 55, a sun gear 58, a carrier 59, and four planetary gears 57. The internal gear 55 is connected to a second output shaft 38 (described below) to rotate together therewith. The sun gear 58 is connected to the lower case 10 to be unable to rotate. The carrier 59 is connected to the drive shaft 14 to rotate together therewith. The planetary gears 57 are rotatably supported by the carrier 59 and meshed with the sun gear 58 and the internal gear 55.

Figure 4:
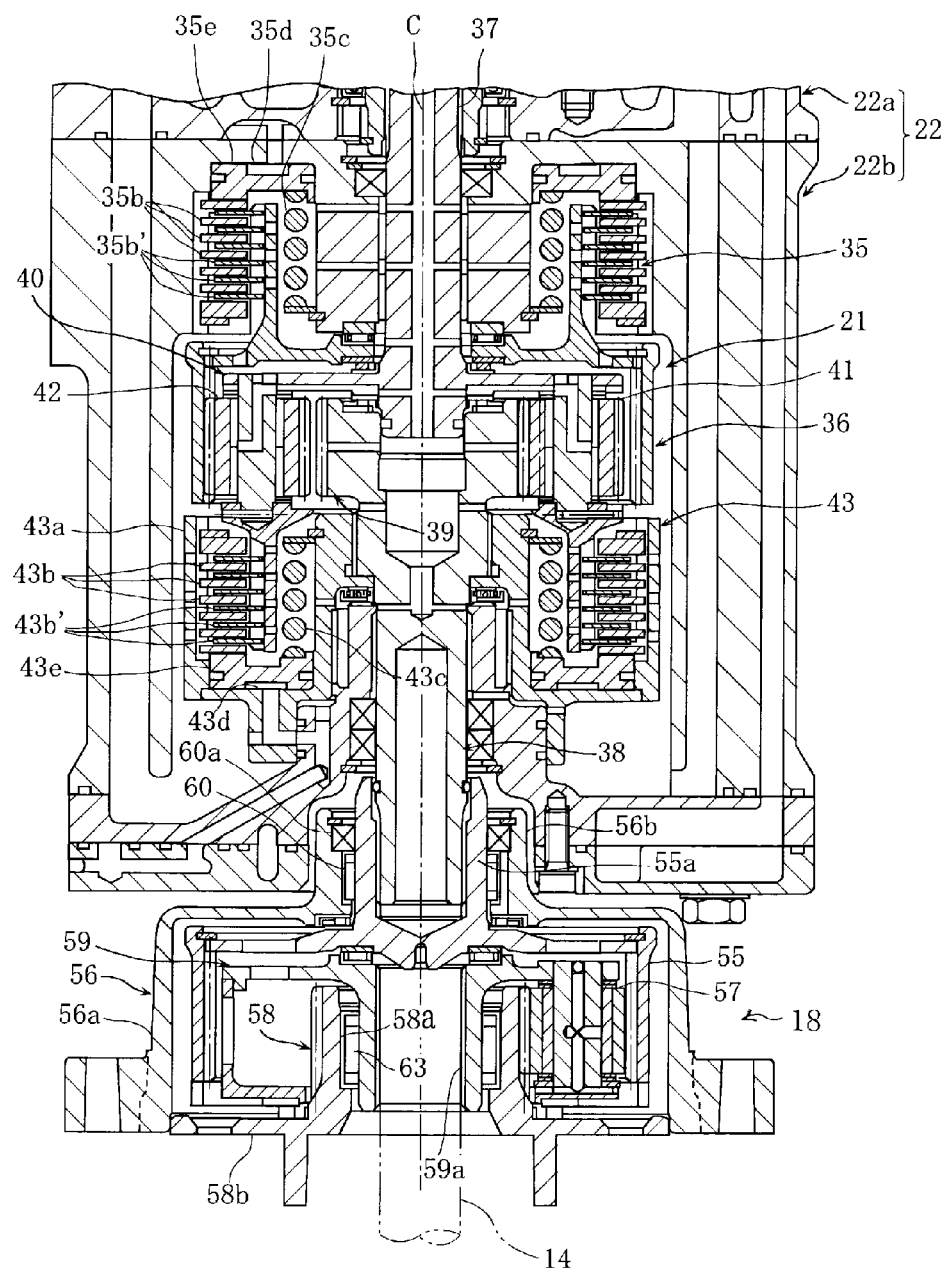
FIG. 4 is a cross-sectional view of a planetary gear type forward-reverse switching mechanism of a transmission device in accordance with a preferred embodiment of the present invention.
Figures 5A, 5B:
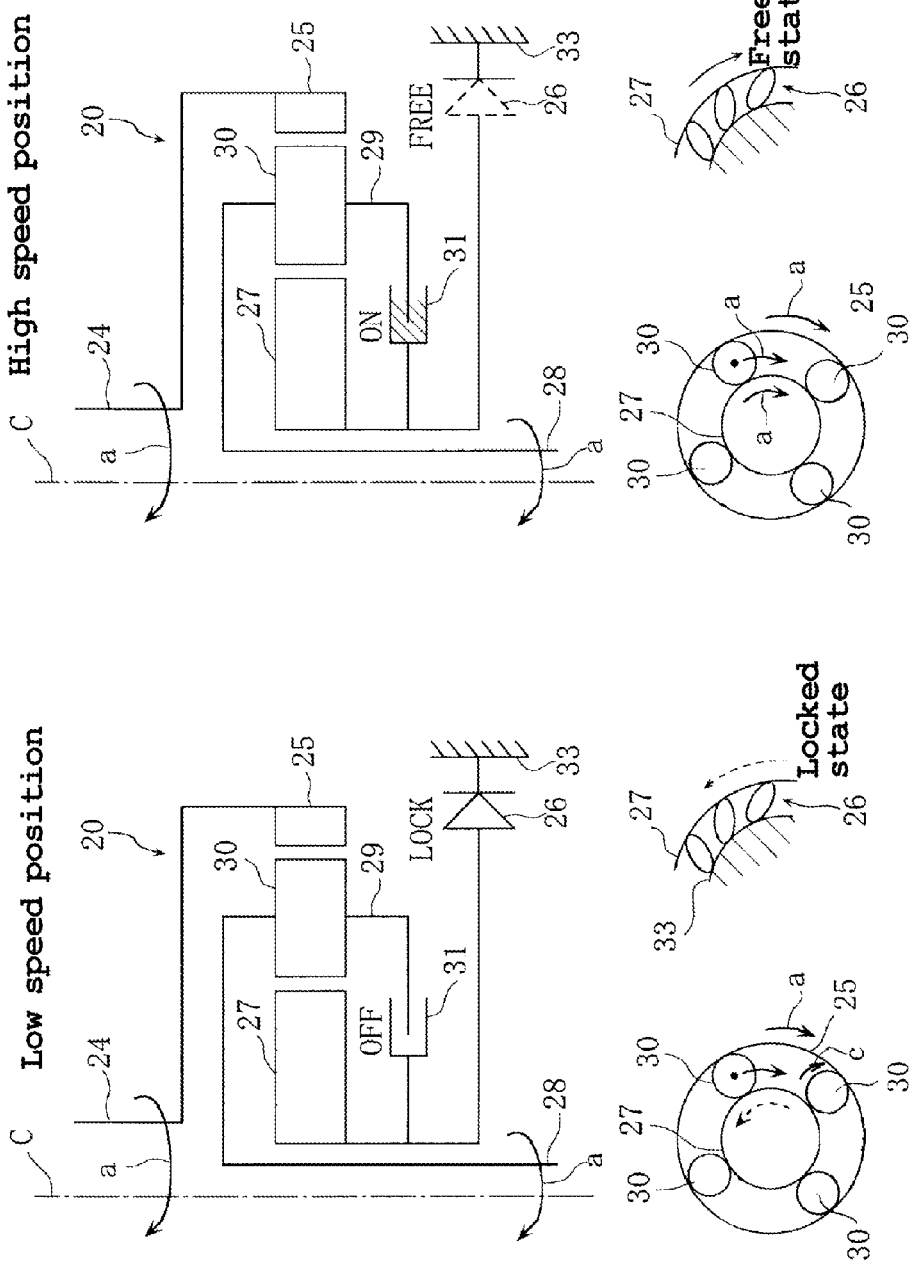
FIGS. 5A and 5B are schematic block diagrams showing actions of a planetary gear type transmission mechanism in accordance with a preferred embodiment of the present invention.
Figure 7:
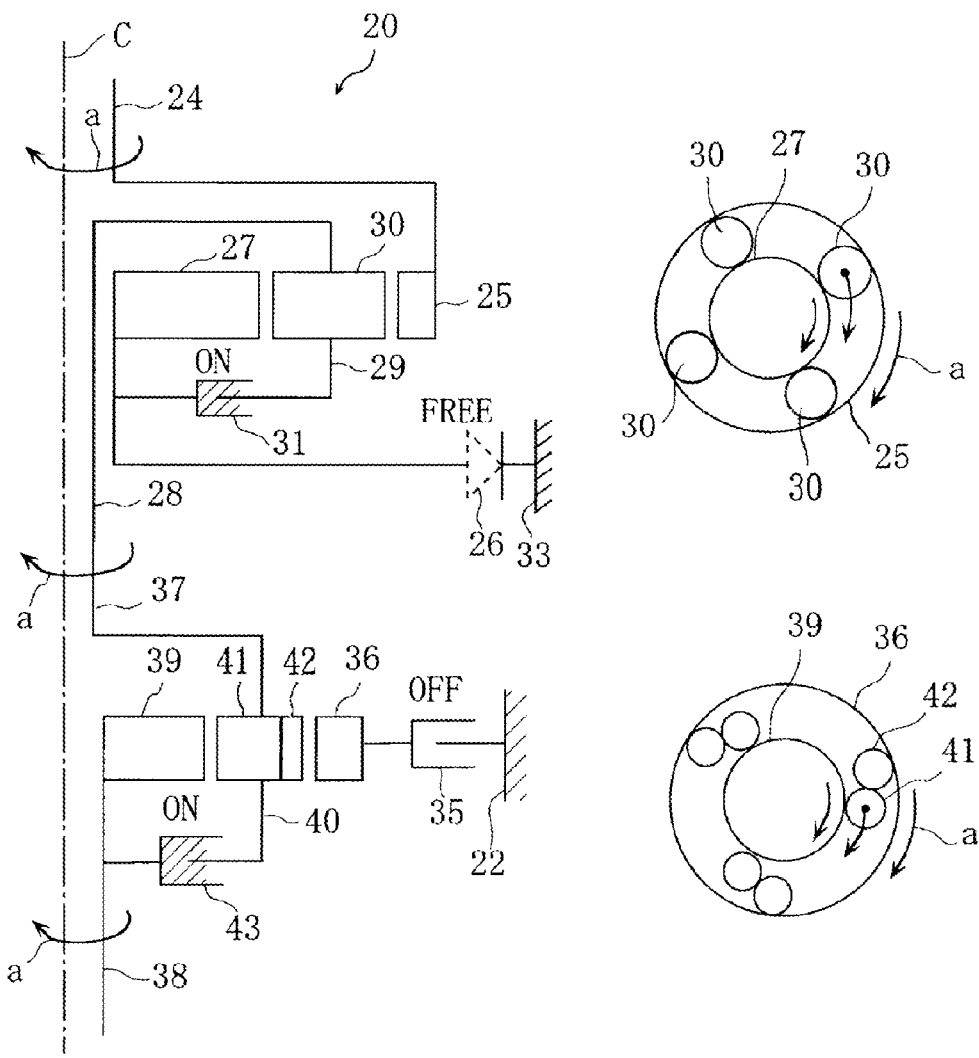
FIG. 7 is a schematic block diagram showing actions of a planetary gear type transmission mechanism and a planetary gear type forward-reverse switching mechanism in accordance with a preferred embodiment of the present invention.

The speed reducer housing 56 has a housing main body 56a and a housing boss 56b (shown in FIG. 4). The housing main body 56a is fixed to an upper surface of the lower case 10 by bolting, for example, and is defined by a generally bowl shape opening downward. The housing boss 56b is integral with the housing main body 56a and preferably has a cylindrical or substantially cylindrical shape arranged to extend into the housing 22.

The internal gear 55 preferably has a cylindrical or substantially cylindrical internal gear boss 55a extending in the housing boss 56b to overlap therewith in a direction perpendicular, or substantially perpendicular, to the axis. The internal gear boss 55a is rotatably supported by the housing boss 56b via a bearing 60. A reference numeral 60a denotes an oil seal.

The second output shaft 38 is coaxially spline-fitted in the internal gear boss 55a to be combined together. Thereby, the internal gear 55 rotates together with the second output shaft 38.

The sun gear 58 preferably has a cylindrical or substantially cylindrical shaft 58a having outer teeth with which each of the planetary gears 57 is meshed and a disc-shaped flange 58b expanding outward from a lower end of the shaft 58a in the radial direction. The flange 58b is fixed to the upper surface of the lower case 10 by bolting.

A shaft 59a of the carrier 59 is inserted in the shaft 58a of the sun gear 58 such that the shaft 58a overlaps with the shaft 59a in a direction perpendicular or substantially perpendicular, to the axis. The shaft 59a of the carrier 59 is rotatably supported by the shaft 58a of the sun gear 58 via a bearing 63.

The planetary gear type transmission mechanism 20 is, for example, a two-speed transmission mechanism arranged to shift between a low speed position and a high speed position. The transmission mechanism 20 is controlled to shift such that all of a first internal gear 25, a first sun gear 27, and the first planetary gears 30 (all described later) unitarily rotate when the speed position is the normally used high speed position. Descriptions will be made hereinafter in detail.

The planetary gear type transmission mechanism 20 has a first input shaft 24, the first internal gear 25, the first sun gear 27, a first output shaft 28, a first carrier 29, the four first planetary gears 30, and a second clutch 31.

The first input shaft 24 is connected to the crankshaft 6a of the engine 6. The first internal gear 25 is connected to the first input shaft 24 to rotate together therewith. The first sun gear 27 is connected to the housing 22 via a first clutch 26. The first output shaft 28 is coaxially disposed with the first input shaft 24. The first carrier 29 is connected to the first output shaft 28 to rotate together therewith. The first planetary gears 30 are supported by the first carrier 29 to be capable of relative rotations and are meshed with both the first sun gear 27 and the first internal gear 25. The second clutch 31 is located between the first sun gear 27 and the first carrier 29.

The first input shaft 24 is coaxially disposed with the crankshaft 6a and combined with the crankshaft 6a to rotate together therewith. An oil pump 45 is coaxially disposed with the first input shaft 24. A water pump 50 is connected to the first input shaft 24 via a power acquisition take-off shaft 46a connected to the crankshaft 6a in a direction perpendicular thereto.

The first sun gear 27 is housed in and fixed to the housing 22 and is connected to a support housing 33 rotatably supporting the first output shaft 28 via the first clutch 26. The first clutch 26 is a one-way type clutch which permits only rotation of the first sun gear 27 in rotational direction (a) (clockwise) of the crankshaft 6a but prohibits rotation in the opposite direction (b) (counterclockwise).

The second clutch 31 is preferably a multiplate disc wet type clutch having a clutch housing 31a, outer clutch plates 31b, inner clutch plates 31b', a piston 31e, and a spring member 31c.

The clutch housing 31a is combined with the first sun gear 27 to rotate together therewith. The outer clutch plates 31b are disposed between the clutch housing 31a and the first carrier 29 and rotate together with the clutch housing 31a. The inner clutch plates 31b' rotate together with the first carrier 29. The piston 31e is disposed in an hydraulic chamber 31d provided in the clutch housing 31a and brings the outer and the inner clutch plates 31b and 31b' into contact with each other with hydraulic pressure supplied to the hydraulic chamber 31d so that power can be transmitted. The spring member 31c urges the piston 31e in a direction that power transmission is disconnected.

When an operator of a watercraft operates a shift lever or button (neither shown) to the low speed position, the second clutch 31 is disengaged. When rotation of the engine 6 in direction (a) is transmitted from the first input shaft 24 to the first internal gear 25 and the first internal gear 25 rotates in direction (a), the first clutch 26 enters a locked state, thus blocking the first sun gear 27 from rotating. Therefore, each of the planetary gears 30 revolves on the first sun gear 27 while rotating in direction (c). Thereby, the speed of rotation of the engine is reduced, and the rotation is transmitted from the first carrier 29 to the first output shaft 28 (see FIG. 5A). In the present preferred embodiment, in the case that the engine speed transmitted to the first input shaft 24 is 1,000 rpm, for example, the rotational speed of the first output shaft 28 is approximately 769 rpm, for example. An engine speed corresponding to starting or trolling can be obtained.

On the other hand, when operation is changed to the high speed position, the second clutch 31 is engaged. When rotation of the engine 6 in direction (a) is transmitted from the first input shaft 24 to the first internal gear 25, the first clutch 26 enters a free state, thus enabling the first sun gear 27 to rotate. Accordingly, the first internal gear 25, each of the first planetary gears 30, and the first sun gear 27 unitarily rotate. Rotation of the first input shaft 24 is transmitted to the first output shaft 28 without speed reduction (see FIG. 5B). Thereby, an engine speed corresponding to normal through high speed operation can be obtained.

The planetary gear type forward-reverse switching mechanism 21 preferably includes a second internal gear 36, a second input shaft 37, the second output shaft 38, a second sun gear 39, a second carrier 40, three pairs of second planetary gears 41 and third planetary gears 42, and a fourth clutch 43.

The second internal gear 36 is connected to the housing 22 via a third clutch 35. The second input shaft 37 is coaxially disposed with the first output shaft 28 and connected to the first output shaft 28 to rotate together therewith. The second output shaft 38 is coaxially disposed with the second input shaft 37. The second sun gear 39 is unitary and integral with and connected to the second output shaft 38. The second carrier 40 is connected to the second input shaft 37 to rotate together therewith. The second planetary gears 41 are rotatably supported by the second carrier 40 and meshed with the second sun gear 39. The third planetary gears 42 are meshed with the second internal gear 36. The fourth clutch 43 is located between the second carrier 40 and the second output shaft 38.

The third clutch 35 and the fourth clutch 43 preferably are multi-plate disc wet type clutches having constructions generally similar to the second clutch 31 described above.

The third clutch 35 has outer clutch plates 35b, inner clutch plates 35b', a piston 35e, and a spring member 35c.

The outer clutch plates 35b are disposed between the second internal gear 36 and the lower housing 22b and locked on the lower housing 22b. The inner clutch plates 35b' rotate together with the second internal gear 36. The piston 35e is disposed in an hydraulic chamber 35d provided in the lower housing 22b and brings the outer and inner clutch plates 35b and 35b' into contact with each other with hydraulic pressure generated in the hydraulic chamber 35d so that power can be transmitted. The spring member 35c urges the piston 35e in a direction that power transmission is disconnected.

The fourth clutch 43 has a clutch housing 43a, outer clutch plates 43b, inner clutch plates 43b', a piston 43e, and a spring member 43c.

The clutch housing 43a is combined with the second sun gear 39 to rotate together therewith. The outer clutch plates 43b are disposed between the clutch housing 43a and the second carrier 40 and locked on the clutch housing 43a. The inner clutch plates 43b' rotate together with the second carrier 40. The piston 43e is disposed in a hydraulic chamber 43d provided in the clutch housing 43a. The spring member 43c urges the piston 43e in a direction that power transmission is disconnected.

When a forward-reverse switching lever or button (neither of which is shown) is in a neutral position, the third and fourth clutches 35 and 43 are disengaged. When the second input shaft 37 and the second carrier 40 rotate in direction (a) in this state, the second planetary gears 41 and the paired third planetary gears 42 rotate in directions (c) and (d), respectively, that are directions opposite to each other, and they also revolve on the second sun gear 39 and on the second internal gear 36. Thereby, the second input shaft 37 idles, and rotation of the engine is not transmitted to the second output shaft 38 (see FIG. 6B).

When a shift is made from the neutral position to the forward position, the third clutch 35 is disengaged, and the fourth clutch 43 is engaged. When the second input shaft 37, the second carrier 40, and the second and third planetary gears 41 and 42 rotate in direction (a) in this state, the second output shaft 38 also rotates in the same rotational direction and at the same rotational speed.

On the other hand, a shift is made from the neutral position to the reverse position, the third clutch 35 is engaged, the fourth clutch 43 is disengaged, and the second internal gear 36 is fixed to the housing 22 to be unable to rotate. When the second input shaft 37 and the second carrier 40 rotate in direction (a) in this state, the second planetary gears 41 and the paired third planetary gears 42 rotate in directions (c) and (d), respectively, that are directions opposite to each other, they also revolve in direction (a), and the second sun gear 39 rotates in the opposite direction (b). Thereby, the second output shaft 38 rotates in reverse traveling direction (b) that is opposite to rotational direction (a) of the crankshaft 6a (see FIG. 6C).

When the forward-reverse switching mechanism 21 is in the forward position and the transmission mechanism 20 is in the high speed position, the second clutch 31 is engaged, and the first clutch 26 is disengaged. Further, the third clutch 35 is disengaged. The fourth clutch 43 is engaged. Thereby, the first internal gear 25, the first sun gear 27, and each of the first planetary gears 30 unitarily rotate. The second internal gear 36, the second sun gear 39, and the second and third planetary gears 41 and 42 unitarily rotate (see FIG. 7).

Figure 2:
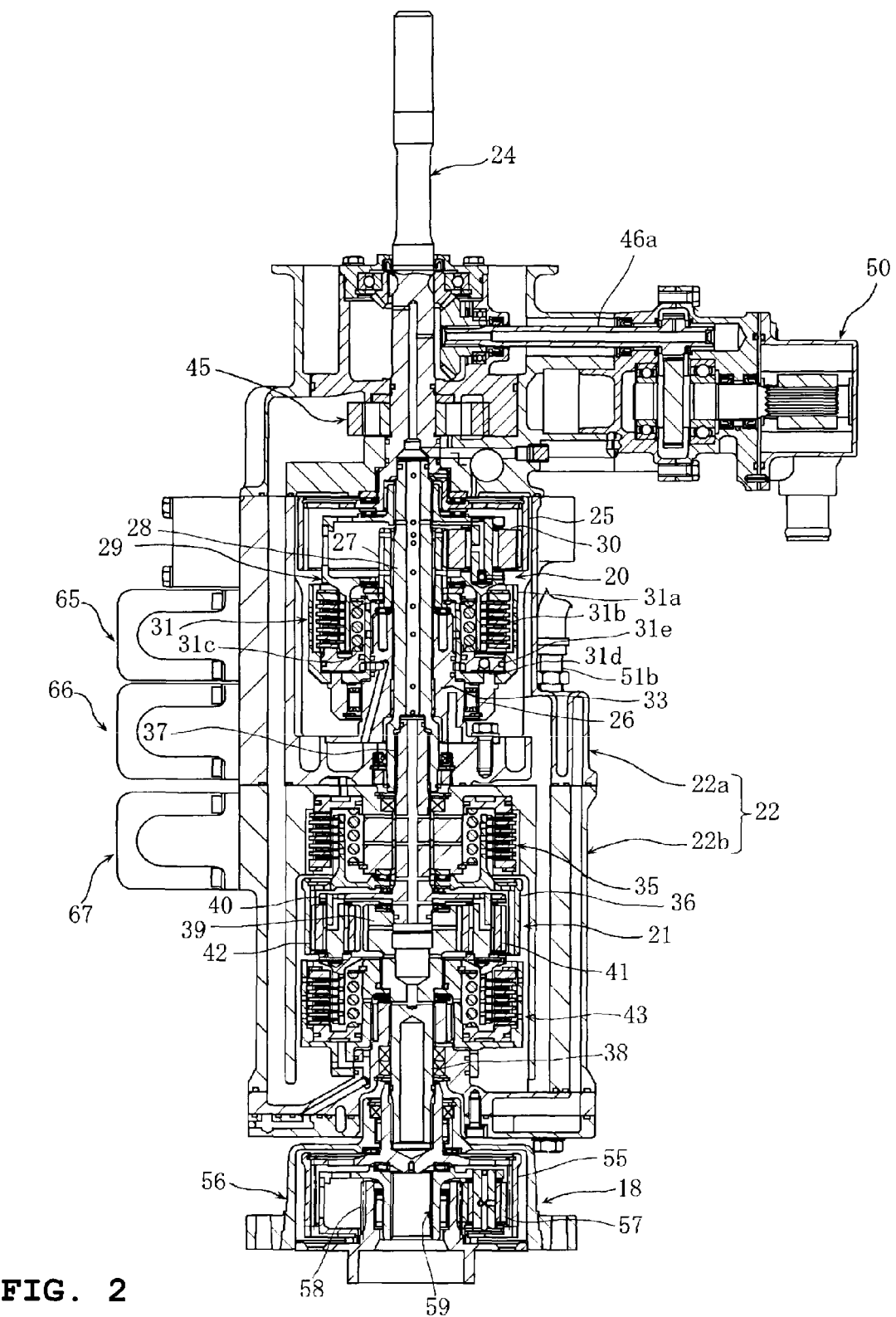
FIG. 2 is a cross-sectional rear view of a transmission device in accordance with a preferred embodiment of the present invention.
Figure 3:
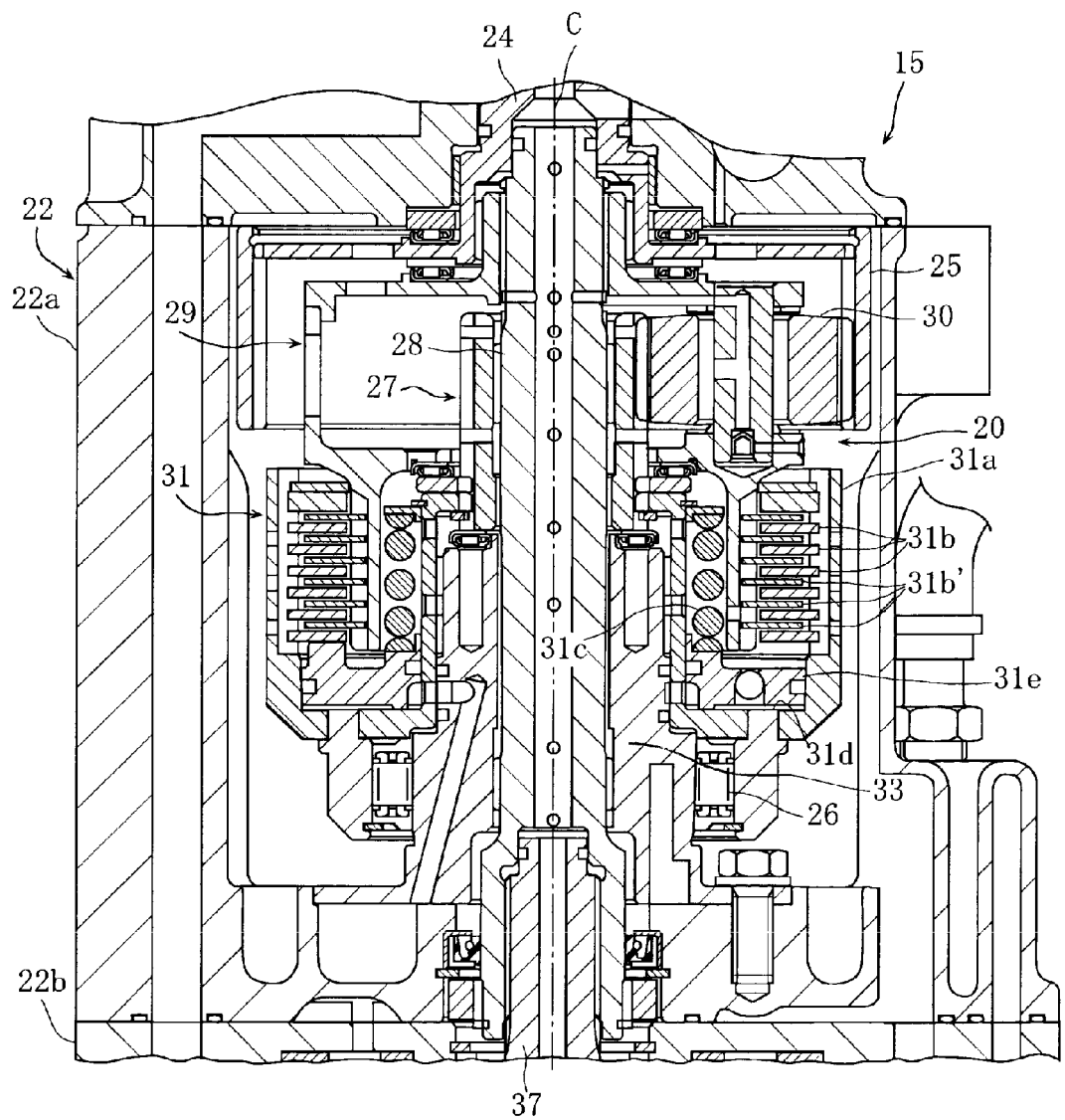
FIG. 3 is a cross-sectional view of a planetary gear type transmission mechanism of a transmission device in accordance with a preferred embodiment of the present invention.

As shown in FIG. 2, hydraulic control valves 65 through 67 arranged to independently control hydraulic pressure supplied to the second, third, and fourth clutches 31, 35, and 43 are disposed in parallel, or substantially in parallel, in a direction along the crankshaft 6a on the port side of the housing 22 in the watercraft width direction. Each of the hydraulic control valves 65 through 67 is controlled by a controller (not shown) to open or close based on a speed shifting signal, a forward-reverse switching signal, and so forth.

In accordance with one preferred embodiment, when the planetary gear type transmission mechanism 20 is shifted to the normally used high speed position, the first internal gear 25, the first sun gear 27, and each of the first planetary gears 30 unitarily rotate. This allows for a reduction in the engagement load caused by relative rotation between a sun gear and a planetary gear in conventional cases and allows for improvement in durability of each of the gears 25, 27, and 30.

In this preferred embodiment, the planetary gear type transmission mechanism 20 is preferably constructed such that the first sun gear 27 is connected to the housing 33 via the first clutch 26 and the second clutch 31 is located between the first sun gear 27 and the first carrier 29 connected to the first output shaft 28. When a shift is made to the high speed position, the first clutch 26 is disengaged, and the second clutch 31 is engaged. This allows for unitary rotation among the first internal gear 25, the first sun gear 27, and the first planetary gears 30. Accordingly, the load due to engagements between each of the gears 25, 27, and 30 can be reduced, and durability can be enhanced.

In accordance with this preferred embodiment, when the planetary gear type forward-reverse switching mechanism 21 is shifted to the forward position, the second internal gear 36, the second sun gear 39, and the second and third planetary gears 41 and 42 unitarily rotate. This allows for a reduction in the load caused by engagements between the gears 36, 39, 41 and 42 in the normal forward operation and allows for improvement in durability of each of the gears 36, 39, 41, and 42.

In this preferred embodiment, the planetary gear type forward-reverse switching mechanism 21 is preferably constructed such that the second internal gear 36 is connected to the housing 22 via the third clutch 35 and the fourth clutch 43 is located between the second carrier 40 connected to the second input shaft 37 on the engine side and the second output shaft 38 connected to the second sun gear 39 on the propeller side. When a shift is made to the forward position, the third clutch 35 is disengaged, and the fourth clutch 43 is engaged. This allows for unitary rotation among the second internal gear 36, the second sun gear 39, and the second and third planetary gears 41 and 42. Accordingly, the durability of each of the gears is greatly enhanced.

In the present preferred embodiment, when the planetary gear type transmission mechanism 20 is shifted to the normally used high speed position, the first internal gear 25, the first sun gear 27, and the first planetary gears 30 unitarily rotate. When the planetary gear type forward-reverse switching mechanism 21 is shifted to the forward position, the second internal gear 36, the second sun gear 39, and the second and third planetary gears 41 and 42 unitarily rotate. This allows for a reduction in the load caused by engagements between gears in the forward and high speed positions that are most frequently used and allows for significant improvement in the durability of each of the gears.

In this preferred embodiment, the planetary gear type transmission mechanism 20 is preferably constructed such that the first sun gear 27 is connected to the housing 33 via the first clutch 26 and the second clutch 31 is located between the first sun gear 27 and the first carrier 29 connected to the first output shaft 28. Further, the planetary gear type forward-reverse switching mechanism 21 is preferably constructed such that the second internal gear 36 is connected to the housing 22 via the third clutch 35 and the fourth clutch 43 is located between the second carrier 40 connected to the second input shaft 37 and the second output shaft 38 connected to the second sun gear 39. In the forward and high speed positions, the first clutch 26 is disengaged, the second clutch 31 is engaged, the third clutch 35 is disengaged, and the fourth clutch 43 is engaged. This allows for unitary rotations among the first internal gear 25, the first sun gear 27, and the first planetary gears 30, and among the second internal gear 36, the second sun gear 39, and the second and third planetary gears 41 and 42. Accordingly, the durability of each of the gears of the transmission mechanism 20 and the forward-reverse switching mechanism 21 is greatly enhanced.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An outboard motor comprising:
   a cowling, an upper case, and a lower case;
   an engine arranged to generate power, the engine being arranged in the cowling;
   a transmission device arranged to change a speed of rotation of the engine and to transmit the rotation to a propeller, the transmission device being arranged in the upper case; and
   a bevel gear arranged to receive the rotation from the transmission device and to transmit the rotation to the propeller, the bevel gear being arranged in the lower case; wherein
   the transmission device includes a planetary gear type forward-reverse switching mechanism; and
   the planetary gear type forward-reverse switching mechanism is controlled to shift such that a sun gear and a planetary gear unitarily rotate during forward traveling.

2. The outboard motor according to claim 1, wherein the transmission device further includes a two-speed transmission mechanism including:
   a first internal gear connected to a first input shaft extending from the engine;
   a first sun gear connected to a housing via a first brake;
   a first carrier connected to a first output shaft extending toward the propeller;
   a first planetary gear rotatably supported by the first carrier and meshed with the first sun gear and the first internal gear; and
   a second brake located between the first sun gear and the first carrier; and
   the first brake is disengaged and the second brake is engaged in the higher speed position.

3. The outboard motor according to claim 1, wherein the planetary gear type forward-reverse switching mechanism includes:
   a second internal gear connected to a housing via a third brake;
   the sun gear defining a second sun gear connected to a second output shaft extending toward the propeller;
   a second carrier connected to a second input shaft extending from the engine;
   the planetary gear including a pair of second planetary gears rotatably supported by the second carrier and meshed with the second sun gear and the second internal gear; and
   a fourth brake located between the second carrier and the second output shaft; and
   the third brake is disengaged and the fourth brake is engaged during forward traveling.

4. An outboard motor comprising:
   a cowling, an upper case, and a lower case;
   an engine arranged to generate power, the engine being arranged in the cowling;
   a transmission device arranged to change a speed of rotation of the engine and to transmit the rotation to a propeller, the transmission device being arranged in the upper case; and
   a bevel gear arranged to receive the rotation from the transmission device and to transmit the rotation to the propeller, the bevel gear being arranged in the lower case; wherein
   the transmission device includes a planetary gear type transmission mechanism arranged to shift to at least a lower speed position and a higher speed position and a planetary gear type forward-reverse switching mechanism;

the planetary gear type transmission mechanism is controlled to shift such that a sun gear and a planetary gear unitarily rotate when a speed position is the higher speed position; and the planetary gear type forward-reverse switching mechanism is controlled to shift such that a sun gear and a planetary gear unitarily rotate during forward traveling.

5. The outboard motor according to claim 4, wherein the planetary gear type transmission mechanism is a two-speed transmission mechanism including:
- a first internal gear connected to a first input shaft extending from the engine;
- a first sun gear connected to a housing via a first brake;
- a first carrier connected to a first output shaft extending toward the propeller;
- a first planetary gear rotatably supported by the first carrier and meshed with the first sun gear and the first internal gear; and
- a second brake located between the first sun gear and the first carrier, and arranged to shift to either the higher speed position or the lower speed position;

the planetary gear type forward-reverse switching mechanism includes:
- a second internal gear connected to the housing via a third brake;
- a second sun gear connected to a second output shaft extending toward the propeller;
- a second carrier connected to a second input shaft extending from the engine;
- a pair of second planetary gears rotatably supported by the second carrier and meshed with the second sun gear and the second internal gear; and
- a fourth brake located between the second carrier and the second output shaft; and the first brake is disengaged, the second brake is engaged, the third brake is disengaged, and the fourth brake is engaged during forward traveling in the higher speed position.

* * * * *